United States Patent
Fischer

(10) Patent No.: US 9,417,853 B1
(45) Date of Patent: Aug. 16, 2016

(54) METHOD FOR GENERATING A CODE FOR AN ELECTRONIC CONTROL UNIT

(71) Applicant: eSPACE digital signal processing and control engineering GmbH, Paderborn (DE)

(72) Inventor: Karsten Fischer, Paderborn (DE)

(73) Assignee: dSPACE digital signal processing and control engineering GmbH, Paderborn (DE)

(*) Notice: Subject to any disclaimer, the term of this patent is extended or adjusted under 35 U.S.C. 154(b) by 0 days.

(21) Appl. No.: 14/524,497

(22) Filed: Oct. 27, 2014

(51) Int. Cl.
*G06F 9/44* (2006.01)

(52) U.S. Cl.
CPC ... *G06F 8/34* (2013.01); *G06F 8/35* (2013.01)

(58) Field of Classification Search
CPC .................................................. G06F 8/34
USPC .................................................. 717/101–123
See application file for complete search history.

(56) References Cited

U.S. PATENT DOCUMENTS

| | | | | |
|---|---|---|---|---|
| 5,583,989 A * | 12/1996 | Matsui | ................ | B60K 41/004 703/8 |
| 6,236,910 B1 * | 5/2001 | Iwai | ................ | F02D 41/26 123/480 |
| 6,718,533 B1 * | 4/2004 | Schneider | ................ | G06F 8/10 700/97 |
| 7,689,969 B1 | 3/2010 | Wendling | | |
| 8,589,870 B2 | 11/2013 | Ogilvie et al. | | |
| 8,719,716 B2 | 5/2014 | Wendling | | |
| 2001/0023393 A1 * | 9/2001 | Hagiwara | ........... | F16H 61/0213 703/8 |
| 2003/0110468 A1 * | 6/2003 | Maki | .................. | G06F 8/30 717/106 |
| 2007/0074286 A1 * | 3/2007 | Wendling | ................ | G06F 8/34 726/21 |
| 2007/0261040 A1 * | 11/2007 | Ogilvie | ................ | G06F 8/34 717/146 |

FOREIGN PATENT DOCUMENTS

WO    WO 2007/035491 A1    3/2007

OTHER PUBLICATIONS

Shladover, Steven E., et al. "Automated vehicle control developments in the PATH program." Vehicular Technology, IEEE Transactions on 40.1 (1991): pp. 114-130.*
Johannesson, Lars, Mattias Åsbogård, and Bo Egardt. "Assessing the potential of predictive control for hybrid vehicle powertrains using stochastic dynamic programming." Intelligent transportation systems, IEEE transactions on 8.1 (2007): pp. 71-83.*
Pérez, Laura V., et al. "Optimization of power management in an hybrid electric vehicle using dynamic programming." Mathematics and Computers in Simulation 73.1 (2006): pp. 244-254.*

* cited by examiner

*Primary Examiner* — Satish Rampuria
(74) *Attorney, Agent, or Firm* — Muncy, Geissler, Olds & Lowe, P.C.

(57) ABSTRACT

A method for generating a code from a reference model for use in an electronic control unit for vehicles. An intermediate language model is created from which a code can be generated, which implements the behavior of the reference model. The intermediate language model comprises a first plurality of parameters and information and a second plurality of parameters and information. The intermediate language model is adaptable on the basis of the first plurality of parameters and information, so that a code adapted to a particular control unit can be generated.

22 Claims, 7 Drawing Sheets

Fig. 5

⊞ poscontrol — 53

| poscontrol | | |
|---|---|---|
| Name — 55 | Blocktype — 56 | output.type — 57 |
| switch | Switch | Int16 |
| si | Sum | Int16 |
| select table | Logical Opera... | Bool |
| pos_GT_max | Relational Op... | Bool |
| pos.level | Constant | Int8 |
| enable lookup | Constant | Int16 |
| a6 | Sum | Int16 |
| a5 | Sum | Int16 |
| a4 | Unit Delay | Int16 |
| a3 | Gain | Int16 |
| a2 | Gain | Int16 |
| UPI | OutPort | Int16 |

551

METHOD FOR GENERATING A CODE FOR AN ELECTRONIC CONTROL UNIT

BACKGROUND OF THE INVENTION

1. Field of the Invention

The invention relates to a method for generating a code, particularly a production code, from a reference model, for use in an electronic control unit for vehicles.

2. Description of the Background Art

The term "reference model" typically refers to a model or submodel for generating a code, whereby the reference model according to the invention describes a model available to a developer of a particular control unit (electronic control unit, ECU). The reference model is used here to model the (algorithmic) behavior or subfunctions of an electronic control unit for the purpose of model-based software development.

The term "code" typically describes the program code, generated from the model, for an embedded system. The modeled algorithm in this case is implemented in the code, so that the behavior of the generated code corresponds to the behavior of the model. A known program for code generation from such models is, for example, TargetLink used in the Simulink graphical development environment.

The term "production code" typically refers to program code, which has been adapted to the quality and efficiency criteria of a specific hardware and software platform employed in a real-world system. Thereby is to be distinguished from for example prototyping code.

The term "electronic control unit" can be understood as a control system, thus, for example, a control device for a motor vehicle. Such a control unit has a particular combination of hardware and software. Thus, a control unit can also have an operating system or other software functionalities, which can then be further supplemented. The electronic control unit can be used thereby, for example, for measuring, controlling, regulating, and/or calibrating vehicle components.

The term "vehicle" can be used as an inclusive designation for watercraft, land vehicles, aircraft, spacecraft, and/or combinations thereof.

In the environment of the model-based software development for embedded systems, it is common to have an external developer carry out the code generation and/or control device development from models or submodels.

To this end, typically the first-party developer himself generates from a model to be protected the code that is then sent to the second-party developer and can be used by the latter for simulation and combination with a further code to compile a complete code for the later control device hardware. This has the advantage that the second-party developer cannot see the model as such. It is nevertheless disadvantageous in this case that this code provided by the first-party developer can be adapted only to the source code level, which in the case of a necessary adaptation for integration into the code, which is available or to be generated additionally by the second-party developer, for a specific control unit first requires switching to just this level.

In order to address the need for such measures during code generation by the first-party developer, the possibility was created to generate a completely invisible model from the model to be protected and to incorporate as it were unadapted the code, generated thereby from the protected model by the first-party developer, at the second-party developer during the complete code generation from a higher-order model. This means that the code generated by the first-party developer is automatically integrated into the environment code during code generation in the development environment of the second-party developer. It is disadvantageous here as well, however, that the final adaptation to the control unit to be used and its hardware specification can occur only by adaptation at the source code level or by additional frame code, which carries out the adaptation.

In the first case the already described break in the consistency between model and code is a disadvantage; in the second case the efficiency (runtime performance) of the system is reduced by the additional code and the cost (RAM/ROM usage) is increased. The optimization potential by hardware-specific code generation is also not utilized.

The solution to the above-described situation known from the conventional art is to transmit the model in plain text, in order to enable adaptation later by the second-party developer, and subsequently to develop adapted code therefrom. In so doing, however, it is not possible to protect the model and the intellectual property associated therewith.

A further conventional solution is that the second-party developer provides the first-party developer its development environment and the first-party developer can thus generate an adapted code. The latter can again provide this in source code or also as object code to the second-party developer for integration. Nevertheless, the first-party developer would then assume the responsibility for the correctness of the code, which again would be undesirable or also not at all possible because of lack of technical competence.

SUMMARY OF THE INVENTION

It is therefore an object of the invention to provide a method, which allows a first-party developer, on the one hand, to generate a code, particularly production code, adapted to a particular control unit (and thus more efficient) by a second-party developer from a model, without all details of the underlying models having to be disclosed for this purpose and thereby enables the second-party developer simultaneously to adapt the generated code to the particular control unit, without having to switch to the source code level for this purpose. Further, the second-party developer is to be enabled to incorporate the model into a higher-level model and thus to be able to develop model-based and to generate a consistent, optimized complete code.

In an embodiment according to the invention by a method includes the following steps: creating an intermediate language model from which code can be generated, which implements the behavior of the reference model, whereby a first plurality of predetermined parameters and information in the intermediate language model is visible and modifiable, and a second plurality of predetermined parameters and information in the intermediate language model is not visible; adapting the intermediate language model on the basis of the first plurality of predetermined parameters and information for the purpose of generating a code adapted to a particular electronic control unit; and generating a code on the basis of the adapted intermediate language model.

The invention is based on the finding that the increasing complexity of the individual development steps during the development of control units with appropriate software components often requires the involvement of a number of developer parties. It is of advantage in this respect if the first-party developer, the developer of the reference model from which the code is to be generated, need not completely disclose the reference model to a second-party developer contracted to generate the code. Furthermore, the invention is based on the finding that it is likewise necessary to be able to adapt the generated code by the second-party developer to each particular control unit without great effort, thus, for example, without constant switching to the source code level.

In particular, because code generation and code testing also occur model-based today, the second-party developer accordingly would also like to be able to develop, therefore to simulate and test, with use of models at the model level, and naturally also to specify and/or adapt the individual code parameters there. Otherwise, after a change or expansion of the model, the code, not generated model-based, would also have to be consistently adapted once again, which may be very time-consuming. In contrast, in automatic code generation the consistent adaptation, i.e., updating, of the associated code occurs, so to say, "at the touch of a button." This has the advantage that the model and the code do not diverge at any time. Conversely, necessary code adaptations are stored in the model, so that it as well can also be kept consistent perforce.

The method of the invention offers the first-party developer the option of generating from his reference model a hidden intermediate language model, which contains parameters and information in an intermediate language, from which a code can be generated that implements the behavior of the reference model in the development environment of the second-party developer. These "parameters and information" are understood to be the individual model and code parameters such as, for example, the names of individual blocks within the reference model or gain factors.

Compared with the reference model, the intermediate language model is now reduced to a specific amount of information, the maximum necessary for code generation, and, for example, after the creation no longer contains all names, any inactivated subsystems, and/or any hierarchical levels of the reference model. Instead, names are hidden and hierarchical levels are combined, so that readability and understanding are made more difficult. As a result, it is no longer easily possible to reproduce directly the model algorithm to be protected.

The first-party developer furthermore during the creation of the intermediate language model can selectively set which parameters and information of the reference model within the intermediate language model can be seen and modified and which are obscured. In this case, "obscured" can mean that the appropriate parameters and information are no longer shown in plain text in the intermediate language model, but are replaced with meaningless strings or shown only hidden, or also, for example, shown as a black box in the case of block diagrams.

Thus, the first-party developer is enabled to select from a series of parameters of the reference model precisely the parameters and information that are required for generating code within the development environment of the second-party developer. In particular, parameters are selected hereby that make it possible to adapt the generated code precisely to the predetermined control unit and/or software environment. For example, the thus generated code could be configured such that it accesses directly the hardware register of the control unit CPU (or another chip) and can read it. Likewise, however, the code could also be configured so that it takes the corresponding information from a software driver, which belongs to the corresponding hardware, or from some other software component.

On the other hand, the parameters and information, set as not visible and modifiable by the first-party developer, are no longer shown in plain text after creation of the intermediate language model. The second-party developer therefore cannot readily identify the parameters and information dealt with here. This very selective selection between visible and obscured parameters and information assures that the second development party can affect the generation of the code precisely to the degree of freedom selectively established beforehand by the first-party developer.

The thus configured intermediate language model is then sent on by the first-party developer to the second-party developer. According to an embodiment of the invention, the reference model can no longer be reconstructed completely from this intermediate language model without other information from the first-party developer; this has the result of increasing the protection for the intellectual property of the first-party developer.

A significant advantage of the present invention is that the second-party developer in this way receives an intermediate language model, which is implemented so that he can set only the parameters and information necessary for adapting the code to be generated. The other parameters and information not relevant to code generation within the development environment of the second-party developer remain hidden.

According to an embodiment of the invention, the intermediate language model can be adapted to a particular control unit and/or further software environment, on the basis of the visible and modifiable parameters and information of the reference model. This achieves that the second-party developer no longer needs to switch to the source code level for a specific adaptation, but can undertake the adaptations directly in the model, namely, precisely to the extent to which the first-party developer had specified and thus released the adaptation. Further, the adaptation of the intermediate language model to the particular control unit and/or software environment still occurs via code parameters, which are used for the more precise setting of the code and therefore configure in greater detail the corresponding code generation. As a result, the code generation can target the appropriate control unit and/or software environment.

After the adaptation of the intermediate language model to the particular control unit, the second-party developer carries out a code generation based on the adapted intermediate model. The thus generated code is therefore suitable for any particular control unit and/or software environment.

In an embodiment of the invention, the parameters and information are associated with the reference model. Further, these parameters and information include elements of the reference model, including but not limited to blocks and lines representing signals, data elements representing model or code variables, and properties of the elements of the reference model, including but not limited to gain factors, block names, descriptions, and code generation properties, including but not limited to variable classes, scaling and offset parameters, and code data types.

In an embodiment of the invention, during the creation of the intermediate language model, a completely or partially accessible central data container is provided which enables the adaptation of the intermediate language model. It is preferred further that the creation of the intermediate language model imposes predetermined limitations of the first plurality of predetermined parameters and information on the intermediate language model.

Providing completely or partially accessible data containers supplies additional information to the second-party developer. For example, the interfaces of the reference model within the data container can be identified. According to the invention, the additional information can also be configured such that the code generation can be controlled more accurately by the developer. Furthermore, the first-party developer can specify precise instructions for the code generation within the data container or establish suitable limitations.

The creation of the intermediate language model for the parameters and information, visible and modifiable in the model, can stipulate a modifiability of these parameters and information, a target system of the code to be generated, the display of names of individual elements of the reference model within the intermediate language model, and the definition whether the code to be generated is to be fixed-point (FXP) or floating-point (FLP) code.

The limitations established during the creation of the intermediate language model can be selected specifically for individual parameters and information according to the invention. Thus, for example, it can be stipulated whether individual parameters and information can be calibrated and the associated code representations are to be stored in a calibration file after the code generation. Such calibration files can be saved, for example, in the ASAP2 format and can contain calibration parameters of the calibration process and further internal variables. The saving of a calibration file in a standard format such as ASAP2 serves here to facilitate the data exchange between the different parties, all of which are involved in the calibration process.

Furthermore, it can be established by the creation of the intermediate language model whether individual elements of the reference model are displayed as visible and modifiable parameters and information within the intermediate language model with their original names, or whether the names of the individual element are also to be shown therefore as hidden parameters and information, modified by the creation of the intermediate language model. The names of parameters and information, which are only displayed hidden in the intermediate language model, according to the invention are generally also only contained hidden in the generated code. The selection of the individual element of the reference model, which are displayed hidden or in plain text, can be carried out very selectively. For example, it is possible according to the invention that only parameters and information required for certain processes are displayed in plain text.

According to an embodiment of the invention, the target system for which the code is to be generated can also be specified by the creation of the intermediate language model. In this regard, for example, the type of target system such as, for example, a microcontroller or a compiler, or the processor architecture (16 bit, 32 bit, etc.) can be predetermined.

The first-party developer during the creation of the intermediate language model according to the invention can specify further whether fixed-point (FXP) code or floating-point (FLP) code is to be generated. In the case of FXP code generation, the first-party developer must specify hereby the scaling, etc., or at least provide information on possible minima and maxima. For example, the first-party developer can supply as information a maximum in the form of a maximum speed of a vehicle. As a result, auto-scaling can be carried out, according to which the scaling of the inputs and outputs of the intermediate language model were set in keeping with the environment. FXP code according to the invention can be generated from the generated code using back annotation. In this regard, the second-party developer first generates FLP or unscaled code from the intermediate language model and can then set the scaling for individual parameters of the code using the generated code. This scaling can then be used by the application software such as, for example, TargetLink, in a next iteration of the code generation from the intermediate language model. It is provided further that the application software stores in addition the minima and maxima, calculated during code generation, in the totally or partially accessible data container or enters them as comments in the generated code.

It is preferred, further, that the second plurality of predetermined parameters and information is non-modifiable. It is hereby provided, according to the invention, that the first-party developer can choose very selectively which individual parameters and information from the second plurality are not only displayed hidden but are also blocked by the development environment from changes by the second-party developer, e.g., by additional markings in the intermediate language model. The markings may have a hash value for the number of non-modifiable elements of the intermediate language model, which in addition is protected by a private key of the first-party developer. The development environment and/or the code generator then checks by means of the associated public key the validity of the hash value and thus the integrity of the parameters and information. If the check fails, the development environment refuses to perform the further processing of the intermediate language model; in particular no code is generated in this case.

The intermediate language model can be inserted into a simulation model and simulated together with this simulation model. According to an embodiment of the invention, the second-party developer integrates the transmitted intermediate language model in his simulation model. It is provided in this case that the intermediate language model is used alone or as part of a larger integration model for generating the (complete) code.

The intermediate language model can then be tested model-based by the second-party developer. To this end, it is provided according to the invention that the intermediate language model, integrated into the simulation model, is interpreted either directly by a development environment of the second-party developer or alternatively a simplified code, for example, a floating-point code, is generated first, which runs in the model-based test instead of the intermediate language model. Generation of the simplified code from the intermediate language model and a subsequent testing could also be carried out according to the invention by the first-party developer in order to check whether the creation of the intermediate language model from the reference model has taken place without errors.

After generation of the code, the second-party developer again performs model-based tests and adapts the code according to the test results. This method is iterated in the so-called back-to-back test until the generated code meets the specifications.

In another embodiment of the invention, during the creation of the intermediate language model further mapping information is generated, which links together the predetermined elements of the reference model and corresponding elements of the intermediate language model. This additional information, compiled during the creation of the intermediate language model, makes it possible that individual elements of the generated code can again be easily assigned to their counterparts in the reference model, therefore functioning as a kind of mapping. It is assured thereby that for each element of the generated code the associated element as well of the intermediate language model and the associated element of the reference model can again be easily found.

In another embodiment of the invention, the mapping information generated with the linking of predetermined elements of the reference model and elements of the intermediate language representation is used to transform the generated code, which includes obscured elements stemming from the intermediate language model, back to a representation including the according non-obscured elements. This back-transformation is performed by the first-party developer's computer by identifying the obscured code elements and tracing these elements back to their corresponding representation in the intermediate language model and using the mapping information to trace the intermediate language model elements to their representation in the reference model. The reference model representations are used to replace the obscured elements in the generated code.

In an embodiment of the invention, the result of the linking of the predetermined elements of the reference model and of the intermediate language model can be stored separately or in the reference model. It is provided according to the invention that the links between the intermediate language model and the reference model are stored in a separate memory element at the first-party developer. Alternatively, these links can also be stored in the reference model, which is likewise only accessible to the first-party developer. The second-party developer does not receive this additional information. This assures that only the first-party developer, i.e., the original developer, is able to assign elements of the code to the elements of the original reference model. This gives the first-party developer a better overview and helps him to reconstruct accurately the elements of his reference model for which code was already generated.

It is provided as an alternative to or in combination with the aforementioned embodiment of the invention to view the result of the linking of the predetermined elements of the reference model and of the intermediate language model in the intermediate language model. It is also possible alternatively according to the invention to grant the second-party developer access to this additional information, if this were to be desired. For this purpose, the invention provides that the information on the links between the reference model and the intermediate language model can be stored visible within the intermediate language model. Thus, these are transmitted together with the intermediate language model to the second-party developer and can there be reproduced on his part.

Each of the embodiments of the present invention can be configured such that the creation of the intermediate language model comprises further an encryption of the reference model, whereby the reference model is attached in encrypted form to the intermediate language model. The reference model here can be contained either in the same file as the intermediate language model or in a container file.

According to an embodiment of the invention, this is a secure encryption which prevents the second-party developer from also being able to see the reference model after transmission of the intermediate language model. Instead, the second-party developer can only see the intermediate language model. This means that during a development process the first-party developer can work on the reference model, whereas the second-party developer can adapt the parts of the intermediate language model to the intermediate language level. If now the first-party developer makes changes to the reference model, the development environment of the second-party developer updates the intermediate language model automatically according to the changes made to the reference model. It is provided according to the invention that the changes made by the first-party developer are made recognizable by the second-party developer, for example, by a direct comparison of the current and the last revised intermediate language model.

In other respects, the second-party developer can make changes to the intermediate language model, which are automatically sent to the first-party developer and are displayed there to said party in the reference model. Thus, the first-party developer can test these directly and selectively decide whether he would like to accept or reject the changes. The automatic updating of the intermediate language model and the reference model can occur hereby according to the invention during the ongoing process or be set up so that it occurs only during the saving or at the touch of a button during export from the development environment.

Such a tracking of the changes can also be achieved with use of a mechanism such as the previously described "mapping," if the reference model and the intermediate language model were separated at the file level and the second-party developer only exchanges the intermediate language model with the first-party developer.

In a further embodiment of the present invention, the creation of the intermediate language model comprises an encryption of the intermediate language model. By this means, the first-party developer can be offered additional protection for his intellectual property.

In the case in which in fact the reference model alone is encrypted, it is basically possible for the second-party developer to see the original information of the reference model during code generation on the basis of the encrypted reference model. This code generation perforce saves the unencrypted information in the working memory of the computing unit from where it can be picked up. Therefore, sufficient protection is not assured by encryption of the reference model alone. If now, however, code is generated from an intermediate language model, the information from the reference model is also available still only hidden for the code generation and it is no longer possible to tap the original information from the reference model.

The first plurality of the predetermined parameters and information can be referenced in the data container, and the adaptation of the intermediate language model can be carried out on the basis of the first plurality of predetermined parameters and information for the purpose of generating the code within the data container. According to this embodiment of the invention, the adaptation to the control unit by the second-party developer occurs not in the intermediate language model but via the data container. For this purpose, according to the invention the visible and modifiable parameters and information are referenced in the intermediate language model. Preferably, the referenced parameters can be, for example, variable objects in which the settings are made by the second-party developer within the data container. The second-party developer therefore sees the data container and can make the adaptation using the variable objects.

Each of the embodiments of the present invention can be configured further such that the method for generating code comprises furthermore an integration of the intermediate language model into an integration model, an adaptation of the intermediate language model on the basis of the first plurality of predetermined parameters and information, and generation of a code on the basis of the integration model with consideration of the intermediate language model.

This embodiment provides that the second-party developer links the intermediate language model, which in this case is a submodel of a larger model, with other submodels within the integration model. In this case, the intermediate language model is linked in the integration model so that a combined (complete) model is obtained. The adaptation of the visible and modifiable parameters and information occurs according to the invention as already described. The generation of the code also occurs as already explained. Nevertheless, in this case, the code is generated not only based on the intermediate language model, but as a complete code from the integration model in which the elements of the intermediate language model are included.

In an example, in each of the embodiments the reference model and the intermediate language model can be graphical models. According to the invention, the reference model and the intermediate language model can be displayed, for example, in the form of block diagrams. Other forms of the graphical representation, such as, for example, state diagrams, are also possible depending on the requirements of the model-based software development.

The graphical representation of the reference model and of the intermediate language model can provide that the amount of information, displayed graphically in the intermediate language model, is smaller than the amount of information, displayed graphically in the reference model. According to this embodiment, a reference model could be, for example, a block diagram, which contains a plurality of information, such as, for example, the names of the block elements in plain text, individual variants of the block diagrams, or the individual subsystems. In the creation of the intermediate language model, for example, unneeded variants or unused subsystems are no longer displayed. According to an embodiment of the invention, the individual elements that are not displayed could be shown as a black box. Thus, only a reduced model is still shown, which is reduced to the elements important for code generation. Furthermore, in the creation of the intermediate language model, the names given in plain text in the reference model can have been hidden. Thus, the creation generates an optimized intermediate language model in which only still relevant information is displayed to the second-party developer.

In an embodiment, only the interfaces of the reference model can be displayed graphically in the intermediate language model. The optimized graphical intermediate language model can be used together with the reference model to create a further optimized graphical intermediate language model, thus, for example, an optimized block diagram. This reflects only in parts the original reference model. Here, the original interfaces are either retained during the creation of the intermediate language model or are identified by the first-party developer in the data container in order to enable thus a correct connection with a simulation model or an integration model and subsequent code generation.

According to a further embodiment of the present invention, the intermediate language model can be a non-graphical model. For example, a non-graphical model can be an intermediate view in the source code level direction. Alternatively, the second-party developer can also be sent an abstract program code as an intermediate language model, in which configurations can be made and which can be converted thereafter to another code, for example, into C.

In this regard, the parameter adaptation can be carried out by the second-party developer, for example, in the property manager of the application software, such as TargetLink, or, as described above, in the data container.

It is advantageous, furthermore, if a source code of the code generated by the second-party developer has a fourth plurality and a fifth plurality of predetermined parameters and information, whereby the fourth plurality of predetermined parameters and information is visible and modifiable and the fifth plurality of predetermined parameters and information is obscured and/or non-modifiable.

This assures that in the case that the code generated by the second-party developer is passed on to a further third-party developer, the intellectual property of the first- and second-party developers can be protected. In this case as well, certain elements of the source code, for example, the interfaces for integration with a further code, can continue to be left visible and other elements can be chosen very selectively to be obscured.

Further, the invention comprises a computer program with a program code, which cause a computing unit to execute the steps of the method for generating a code according to any one of the aforementioned embodiments or combination of embodiments, if the program code is executed by the computing unit.

Furthermore, a method is provided for generating a code from a reference model for use in an electronic control unit for vehicles, the method comprising: providing the reference model to a first computer; creating an intermediate language model from which code is generated, wherein the computer generates the intermediate language model based on the reference model, wherein predetermined parameters and information in the intermediate language model are obscured; and sending the intermediate language model via a network to a remote server computer; generating, using the server computer, a code based on the intermediate language model including the code representations of the obscured parameters and information, and sending the code to the first computer. In this case, the first-party developer wishes to adapt the reference model and have the code generation performed by a second-party developer, for example, by a remote server computer without disclosing all details of the underlying models.

According to a further embodiment of the invention, during the creation of the intermediate language model further mapping information is generated, which links together the predetermined elements of the reference model and corresponding elements of the intermediate language model. This additional information, compiled during the creation of the intermediate language model, makes it possible that individual elements of the generated code can again be easily assigned to their counterparts in the reference model, therefore functioning as a kind of mapping. It is assured thereby that for each element of the generated code the associated element as well of the intermediate language model and the associated element of the reference model can again be easily found.

In another embodiment of the invention, the mapping information generated with the linking of predetermined elements of the reference model and elements of the intermediate language representation is used to transform the generated code, which includes obscured elements stemming from the intermediate language model, back to a representation including the according non-obscured elements. This back-transformation is performed by the first-party developer by identifying the obscured code elements and tracing these elements back to their corresponding representation in the intermediate language model and using the mapping information to trace the intermediate language model elements to their representation in the reference model. The reference model representations are used to replace the obscured elements in the generated code.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5 is an exemplary illustration of a tool for displaying and changing individual parameters and information;

DETAILED DESCRIPTION

Figure 1:
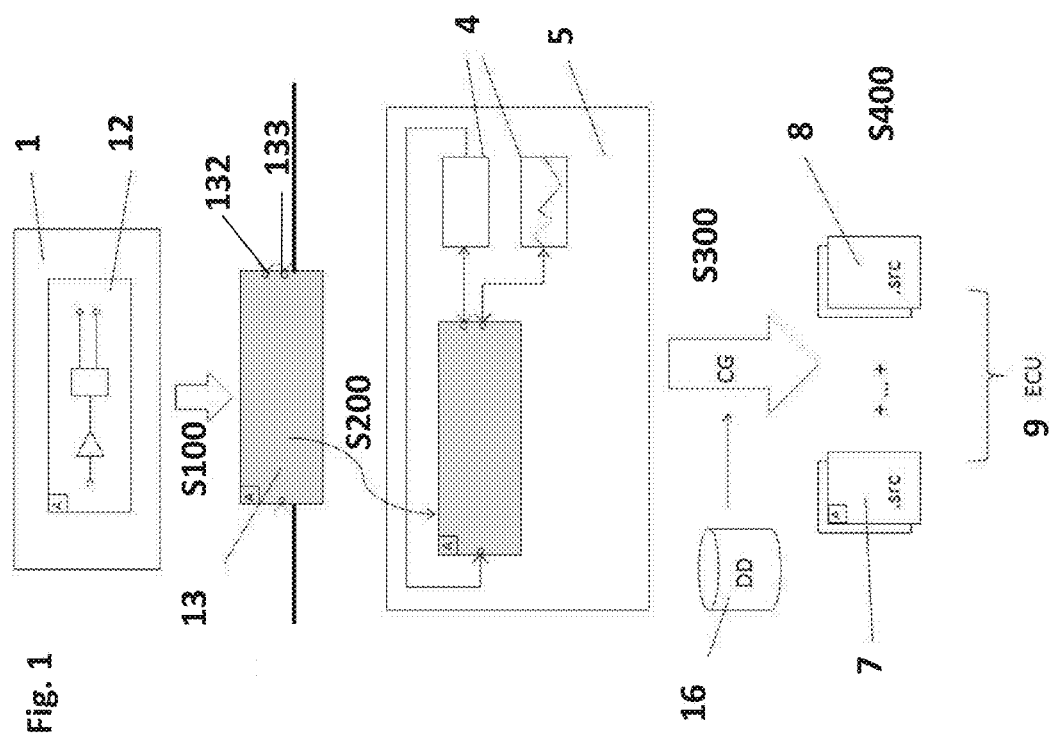
FIG. 1 is a schematic diagram of an embodiment of the method of the invention for generating a code from a reference model by a second-party developer using an adapted intermediate language model.

FIG. 1 shows a schematic diagram of a sequence of an exemplary embodiment of the method of the invention for generating a code 7 from a reference model using an adapted intermediate language model. In the embodiment, the reference model and the intermediate language model are graphical models in the form of block diagrams.

FIG. 1 shows development environment 1 of the first-party developer with reference model 12. In step S100, an intermediate language model 13 is created from reference model 12 by the first-party developer. Intermediate language model 13 of the present embodiment is a graphical model, which contains less information than the reference model and is shown in particular as a black box for which only interfaces 131, 132, 133 can be seen.

The first-party developer during the creation of intermediate language model 13 can choose selectively the parameters and information, which are to be identifiable and modifiable in intermediate language model 13 for the second-party developer. The degree to which the generation of code 7 can be influenced by the second-party developer can be controlled very accurately in this way.

In step S200, intermediate language model 13 is integrated into development environment 5 of the second-party developer. In this way, intermediate language model 3 is connected to simulation model 4 of the second-party developer with use of the interfaces. The second-party developer can now test the model model-based in his development environment 5. In this way, first a model-in-the-loop (MIL) simulation can be performed based on the intermediate language model.

After this, in step S300 intermediate language model 13 is first adapted to the particular control unit (ECU) 9. The adaptation occurs hereby based on the parameters and information of the reference model and based on the code generation settings. The corresponding code 7 is generated thereafter. In this embodiment, the specific parameters and settings from data container 16 of the second-party developer are considered in the generation of code 7. The second-party developer then performs the code generation based on intermediate language model 13 in combination with these specific parameters and settings. During the generation of code 7, not only are the adaptations made by the second-party developer and the specific parameters and settings in data container 16 taken into account, but also the settings, limitations, and options established by the first-party developer in the creation of the intermediate language model.

The second-party developer can then again test model-based with the aid of the thus generated code 7. Now, a software-in-the-loop (SIL) simulation as well can be carried out with the aid of code 7. Based on the simulation, the second-party developer after the adaptation of intermediate language model 13 by a repeated adaptation optimizes the modifiable parameters and information and generates a further adapted code from this adapted intermediate language model, in combination with the specific settings and parameters of data container 16. These steps are hereby carried out so many times until the available result is satisfactory. A measure of whether the result is satisfactory could be, for example, the deviation of the simulation with a fixed-point code from the simulation with a floating-point code, generated from the reference or intermediate language model.

If this is the case, the second-party developer can perform a processor-in-the-loop (PIL) simulation. This simulation enables the testing of the generated code with the target hardware. After this, the second-party developer sends generated code 7 to the first-party developer in step S400. Alternatively, the generated code can be embedded in a control unit 9 and then the finished control unit 9 can be supplied to the first-party developer and installed in the vehicle by him.

The first-party developer thus receives a code 7, generated by the second-party developer, or a finished control unit 9, which contains the modeled functionalities.

In the case that the first-party developer receives code 7, it is provided that said code 7 is compatible with further code 8, so that both codes 7, 8 can be used for control unit ECU 9. The advantage of said method of the invention is that the adaptation to each particular control unit 9 can occur on the second-party developer side, namely, without this developer having to switch laboriously to the source code level.

Figure 2:
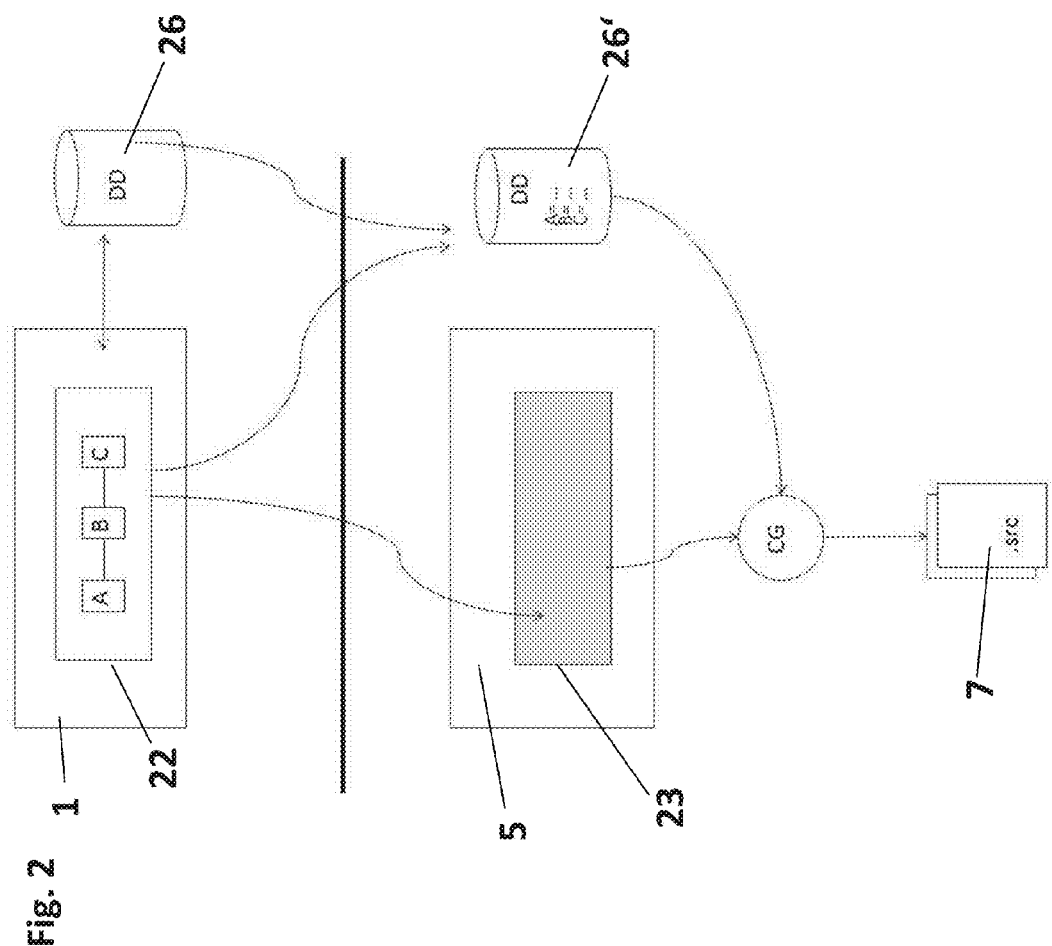
FIG. 2 is a schematic diagram of a second embodiment of the method of the invention for generating a code from a reference model by a second-party developer using an adapted intermediate language model.

FIG. 2 shows a further embodiment of the invention. In this embodiment, reference model 22 within development environment 1 is a model to which a data container 26 is attached. A further set of parameters and information is stored in said data container 26 as additional information to reference model 22.

In this embodiment as well, the first-party developer creates an intermediate language model 23, which contains parameters and information in an intermediate language, from reference model 22. Unlike the case of the first embodiment, however, the first-party developer attaches to the intermediate language model additionally a data container 26', which contains selected parameters and information from original data container 26 and reference model 22. Said selected information from original data container 26 and reference model 22 can be chosen selectively by the first-party developer. The parameters and information stored and referenced in data container 26' are linked to the individual elements of intermediate language model 23.

The second-party developer receives intermediate language model 23 and data container 26'. Because the application software for executing the method of the invention provides for the reading of said data container, the second-party developer can look at data container 26' directly. Thus, the second-party developer is able to integrate intermediate language model 23 with the aid of the additional parameters and information from data container 26' in his development environment 5. After said integration, the second-party developer can then perform a model-in-the-loop (MIL) simulation.

In this embodiment, the next adaptation to particular control unit 9 for the purpose of generating code 7 can be performed with the aid of data container 26' supplied with intermediate language model 23. Within intermediate language model 23, the second-party developer finds references to parameters and information in data container 26'. He can then see these in data container 26' and adapt them according to the specified requirements. Said adaptations from data container 26', together with the intermediate language model, can then serve as the basis for code generation by the second-party developer. Not just the adaptations made by the second-party developer and the specific parameters and settings in data container 26', but also the settings and limitations set by the first-party developer in the creation of the intermediate language model are taken into account in this embodiment as well.

The second-party developer can then perform a software-in-the-loop (SIL) simulation with the aid of the thus generated code 7. In this embodiment as well, the second-party developer optimizes the adaptation of the intermediate language model on the basis of the simulation results by iteration of the process and thereby generates the finished adapted code 7.

Figure 3:
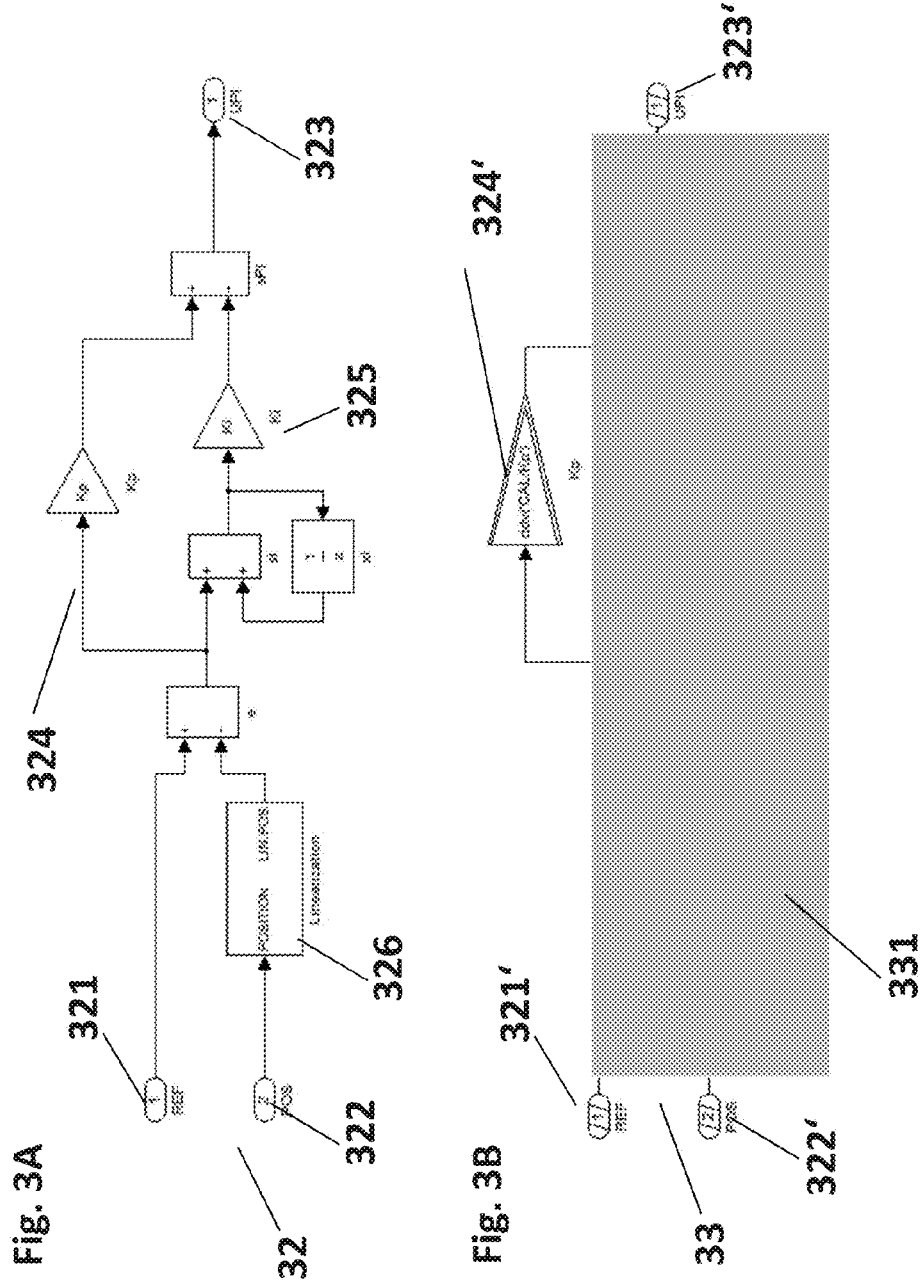
FIG. 3A illustrates an exemplary model with two gain blocks and a subsystem
FIG. 3B illustrates an intermediate language model, generated from the exemplary model in FIG. 3A.

FIG. 3A shows an exemplary reference model 32 and FIG. 3B shows the associated exemplary intermediate language model 33. Here, reference model 32 has two inputs 321, 322 and one output 323. Furthermore, according to FIG. 3A, the reference model has two gain blocks 324 and 325 and one subsystem 326 "linearization." Neither gain block 325 nor subsystem 326 is necessary for code generation by the second-party developer.

Therefore, the first-party developer from available reference model 32 creates an intermediate language model 33, in which only the parameters and information relevant for generating code 7 are displayed as visible and modifiable. In the present case, these are inputs 321', 322', output 323', and gain block 324'. Gain block 325 and unneeded subsystem 326 are present as black box 331. The names of the visible parameters and information are hereby displayed in intermediate language model 33 in an intermediate language, from which code 7 can be generated, which implements the behavior of reference model 32. Inputs and outputs 321', 322', 323' of the intermediate language model serve hereby for connection to the simulation model or integration model 4 within development environment 5.

Reference model 32 according to FIG. 3A is available to the first-party developer. Intermediate language model 33 according to FIG. 3B is available to the second-party developer. This assures that the second-party developer can see only the parameters and information from reference model 32 that are necessary for code generation. After the second-party developer has completed the thus generated code 7 and has sent it to the first-party developer, the latter can assign the corresponding code elements to his model and integrate them into it.

Figure 4:
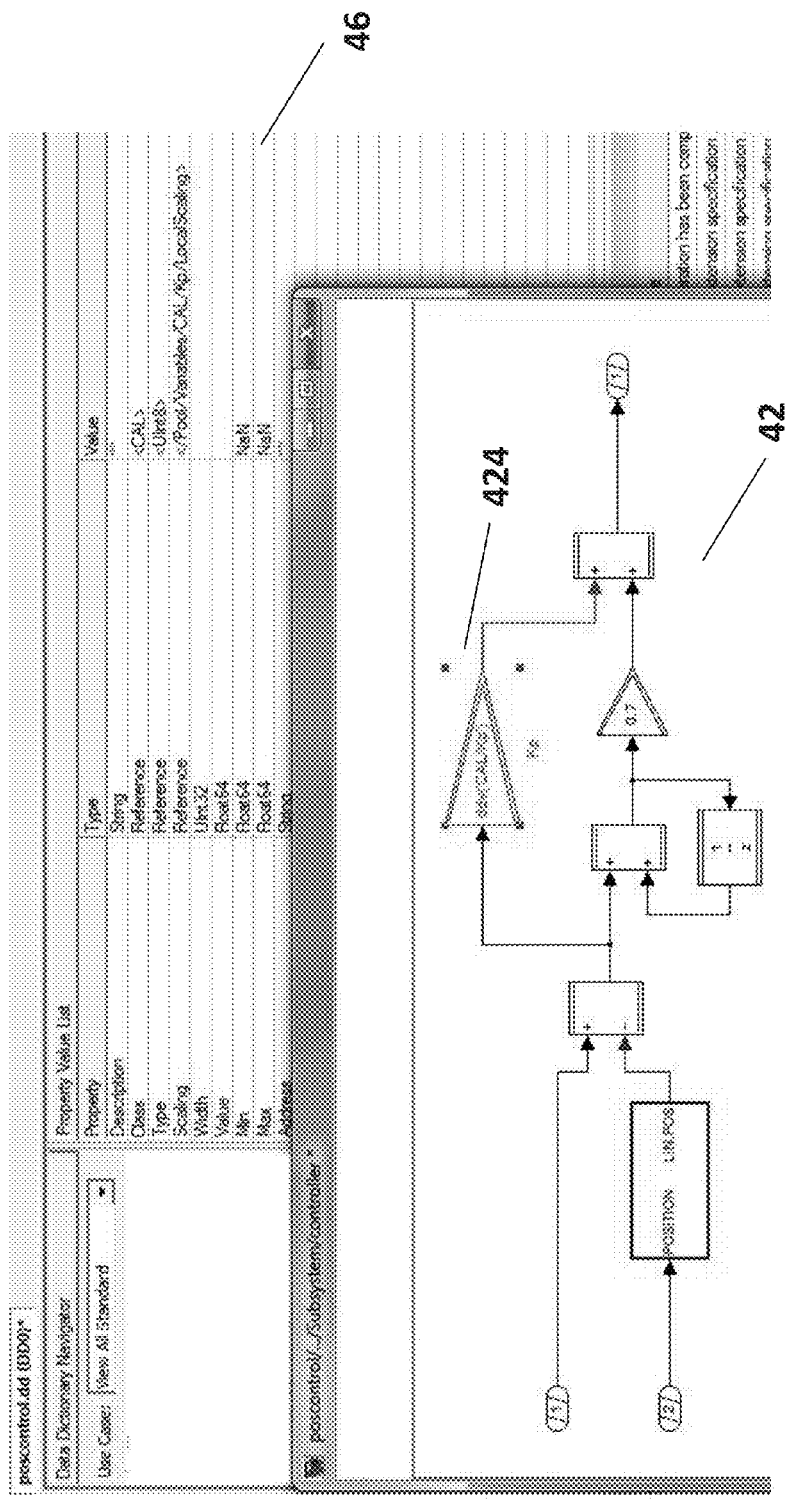
FIG. 4 is a visual illustration of the referencing of parameters and information within the data container.

FIG. 4 shows by way of example the referencing of a variable object 424 from data container 46 in reference model 42. In the example shown here, the application software is TargetLink. Variable object 424 is stored in this case in the so-called TargetLink Data Dictionary (DD) 46. This has the advantage that the second-party developer can make the adaptations of the intermediate language model solely using data container 46. For this purpose, the first-party developer must make available only the references and data container 46 to the second-party developer. The second-party developer then works only in data container 46 and does not need to see either reference model 42 or the intermediate language model. Such an implementation is advantageous primarily in the case of non-graphical reference and intermediate language models.

FIG. 5 shows by way of example a tool for displaying and adapting the individual parameters and information, which can be adapted in intermediate language model 53 by the second-party developer. In this respect, the second-party developer in a column 55 sees the individual parameters and information 551, which are visible and modifiable for the second-party developer. In two other columns 56, 57, the second-party developer can make the settings for the parameters and information 551 according to the desired adaption to the particular control unit 9.

Figure 6:
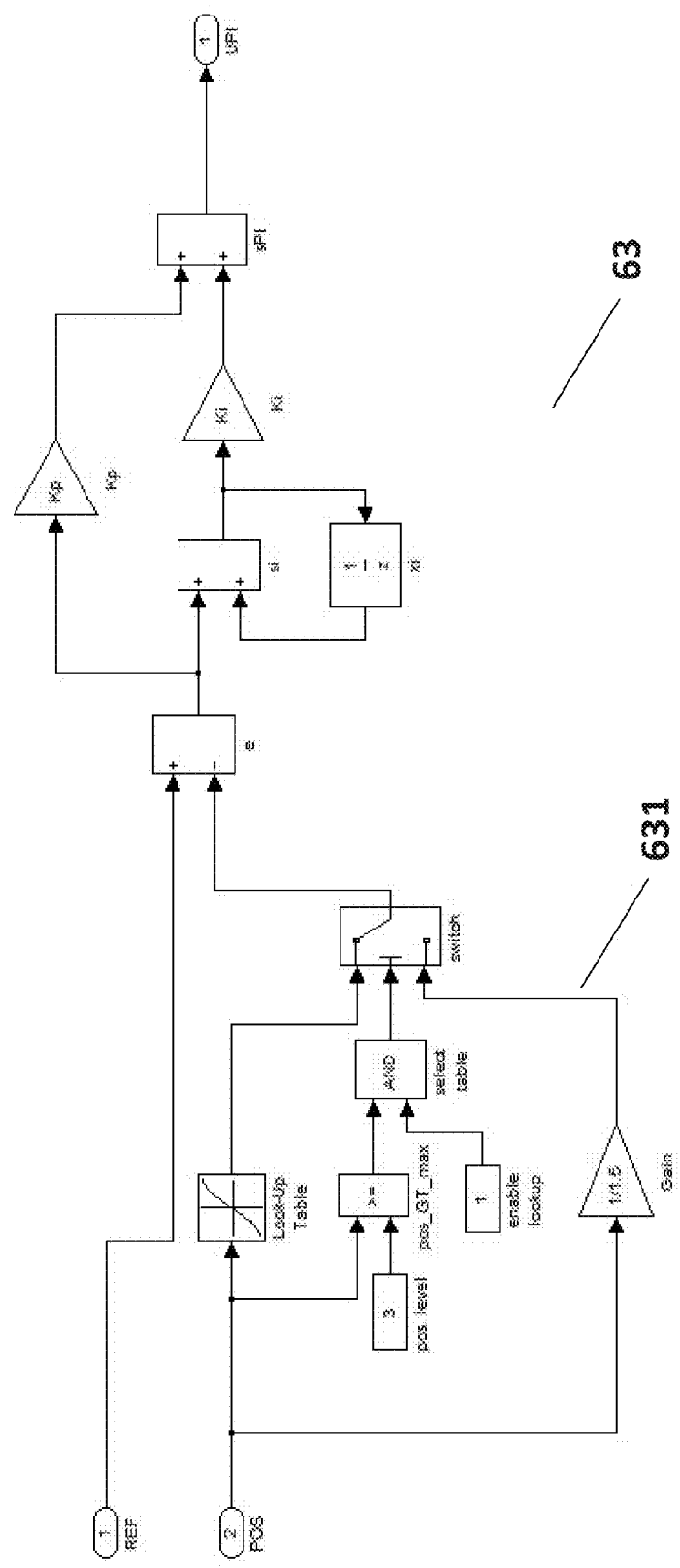
FIG. 6 illustrates an example of an intermediate language model with a broken down subsystem.
Figure 7:
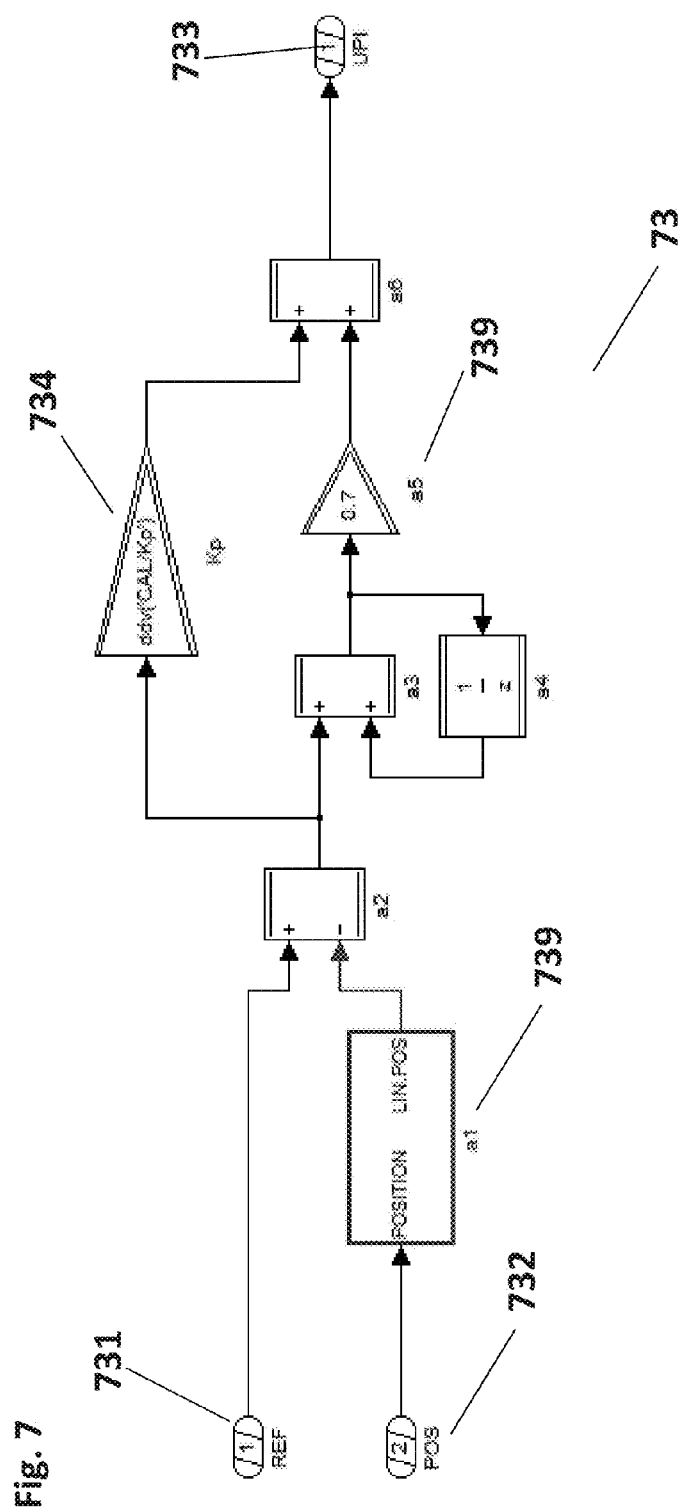
FIG. 7 illustrates an example of an intermediate language model with hidden names.

FIG. 6 and FIG. 7 show by way of example intermediate language models 63 and 73. In FIG. 6, an intermediate language model 63 was created in which a subsystem 631 is shown broken down/flat. The comprehensibility for the user is made difficult in this case, but the modified structure plays no role for code generation, because the algorithm remains untouched.

FIG. 7 shows an intermediate language model 73 in which the names of the parameters and information, not relevant for the code generation by the second-party developer, are displayed by hidden names 739. Only the elements relevant for code generation, the inputs and outputs 731, 732, 733 for connecting intermediate language model 73 with the simulation or integration model 4, and the parameters and information, necessary for generating an adapted code 7 (here a gain block 734), remain unhidden.

According to the invention, the names of the individual parameters and information are assigned during the creation of the intermediate language model 73, so that the second-party developer has no information on the basis of the names on what kind of parameters and information these are. This name allocation can occur alphanumerically but other methods are also possible. It is only desired according to the invention that the names are not descriptive in nature.

The assignment of hidden names 739 for individual parameters and information in intermediate language model 73 to the corresponding elements in the reference model can be stored hereby in table form at the first-party developer, so that he can always reconstruct which parameters and information of intermediate language model 73 belong to which element of the reference model.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method performed by a computer for generating a code from a reference model for use in an electronic control unit for vehicles, the method comprising:
   providing the reference model to a first computer;
   creating an intermediate language model from which code is generated, wherein the first computer generates the intermediate language model based on the reference model, wherein the intermediate language model implements the behavior of the reference model, wherein a first plurality of predetermined parameters and information in the intermediate language model is visible and modifiable and provided to a display, and a second plurality of predetermined parameters and information in the intermediate language model is obscured;
   storing the intermediate language model on a storage medium;
   providing the intermediate language model to a display on a second computer that is different from the first computer;

adapting, using the second computer, the intermediate language model based on the first plurality of predetermined parameters and information to generate a code tailored for use in the electronic control unit for vehicles;

storing the adapted intermediate language model on a storage medium; and generating, using the second computer, the code based on the adapted intermediate language model, and storing the code on a storage medium, wherein a source code of the generated code has a fourth plurality and a fifth plurality of predetermined parameters and information, wherein the fourth plurality of predetermined parameters and information is visible and modifiable, and wherein the fifth plurality of predetermined parameters and information is obscured.

2. The method for generating a code according to claim 1, wherein the first plurality of predetermined parameters and information are associated with the reference model and include:
   elements of the reference model, including blocks and lines representing signals, data elements representing model or code variables;
   properties of the elements of the reference model, including gain factors, block names, descriptions;
   and code generation properties, including variable classes, scaling and offset parameters, and code data types.

3. The method for generating a code according to claim 1, wherein, during the creation of the intermediate language model, a completely or partially accessible central data container is provided that enables an adaptation of the intermediate language model, and wherein the creation of the intermediate language model imposes predetermined limitations of the first plurality of predetermined parameters and information on the intermediate language model.

4. The method for generating a code according to claim 3, wherein the first plurality of predetermined parameters and information is referenced in the central data container, and wherein the adaptation of the intermediate language model is carried out based on the first plurality of predetermined parameters and information for generating the code within the central data container.

5. The method for generating a code according to claim 1, wherein during the creation of the intermediate language model the following is defined:
   a modifiability of the first plurality of predetermined parameters and information;
   a target system for the code;
   a display of names of individual elements of the reference model; and/or
   a determination of whether the code is a fixed-point or floating-point code.

6. The method for generating a code according to claim 1, wherein the second plurality of predetermined parameters and information is non-modifiable.

7. The method for generating a code according to claim 1, wherein the intermediate language model is inserted into a simulation model, and wherein the intermediate language model is simulated together with the simulation model.

8. The method for generating a code according to claim 1, wherein, in the creation of the intermediate language model, mapping information is generated, which links together predetermined elements of the reference model and of the intermediate language model.

9. The method for generating a code according to claim 8, wherein a result of the linking of the predetermined elements of the reference model and of the intermediate language model is stored separately or in the reference model.

10. The method for generating a code according to claim 9, wherein the generated code is provided to the first computer, and wherein the first computer performs the following steps:
    using the mapping information to transform the obscured second plurality of predetermined parameters and information in the generated code back to a representation corresponding to the non-obscured first plurality of predetermined parameters and information of the reference model; and
    storing the transformed code.

11. The method for generating a code according to claim 8, wherein the result of the linking of the predetermined elements of the reference model and of the intermediate language model is visible in the intermediate language model.

12. The method for generating a code according to claim 1, wherein the creation of the intermediate language model comprises an encryption of the reference model, and wherein the reference model is attached in encrypted form to the intermediate language model.

13. The method for generating a code according to claim 1, wherein the creation of the intermediate language model comprises an encryption of the intermediate language model.

14. The method for generating a code according to claim 1, wherein the method further comprises:
    integrating the intermediate language model into an integration model;
    adapting the intermediate language model based on the first plurality of predetermined parameters and information; and
    generating the code based on the integration model with respect to the intermediate language model.

15. The method for generating a code according to claim 14, wherein an amount of information displayed graphically in the intermediate language model is smaller than an amount of information displayed graphically in the reference model.

16. The method for generating a code according to claim 14, wherein only interfaces of the reference model are displayed graphically in the intermediate language model.

17. The method for generating a code according to claim 1, wherein the reference model and the intermediate language model are graphical models.

18. The method for generating a code according to claim 1, wherein the intermediate language model is a non-graphical model.

19. A non-transitory computer readable medium encoded with a program code that causes a computing unit to execute the method for generating a code according to claim 1.

20. The method according to claim 1, wherein the code is a production code.

21. A method performed by a computer for generating a code from a reference model for use in an electronic control unit for vehicles, the method comprising:
    providing the reference model to a first computer;
    creating an intermediate language model from which a code is generated, wherein the first computer generates the intermediate language model based on the reference model, wherein predetermined parameters and information in the intermediate language model are obscured;
    sending the intermediate language model via a network to a remote server computer; and
    generating, using the remote server computer, the code based on the intermediate language model including code representations of the obscured parameters and information, and sending the code to the first computer,
    wherein, in the creation of the intermediate language model, mapping information is generated, which links together predetermined elements of the reference model and of the intermediate language model, and wherein the generated code is provided to the first computer, and wherein the first computer performs the following steps:

using the mapping information to transform the code representations of the obscured parameters and information in the generated code back to a representation corresponding to non-obscured parameters and information of the reference model; and storing the transformed code.

22. A method performed by a computer for generating a code from a reference model for use in an electronic control unit for vehicles, the method comprising:

providing the reference model to a first computer;

creating an intermediate language model from which code is generated, wherein the first computer generates the intermediate language model based on the reference model, wherein the intermediate language model implements the behavior of the reference model, wherein a first plurality of predetermined parameters and information in the intermediate language model is visible and modifiable and provided to a display, and a second plurality of predetermined parameters and information in the intermediate language model is obscured;

providing the intermediate language model to a display on a second computer that is different from the first computer;

adapting, using the second computer, the intermediate language model based on the first plurality of predetermined parameters and information; and generating, using the second computer, a code based on the adapted intermediate language model, wherein, in the creation of the intermediate language model, mapping information is generated, which links together predetermined elements of the reference model and of the intermediate language model, wherein a result of the linking of the predetermined elements of the reference model and of the intermediate language model is stored separately or in the reference model, and wherein the generated code is provided to the first computer, and wherein the first computer performs the following steps:

using the mapping information to transform the obscured second plurality of predetermined parameters and information in the generated code back to a representation corresponding to the non-obscured first plurality of predetermined parameters and information of the reference model; and storing the transformed code.

* * * * *